United States Patent
Vickers et al.

(10) Patent No.: US 9,481,004 B2
(45) Date of Patent: Nov. 1, 2016

(54) PAINT BOOTH FILTER

(71) Applicant: Columbus Industries, Inc., Ashville, OH (US)

(72) Inventors: T. Wayne Vickers, Circleville, OH (US); Mounir B. H. Slama, Dublin, OH (US)

(73) Assignee: Columbus Industries, Inc., Ashville, OH (US)

( * ) Notice: Subject to any disclaimer, the term of this patent is extended or adjusted under 35 U.S.C. 154(b) by 111 days.

(21) Appl. No.: 14/215,570

(22) Filed: Mar. 17, 2014

(65) Prior Publication Data
US 2014/0260140 A1    Sep. 18, 2014

Related U.S. Application Data

(60) Provisional application No. 61/792,956, filed on Mar. 15, 2013.

(51) Int. Cl.
| | | |
|---|---|---|
| B01D 46/00 | (2006.01) | |
| B01D 35/147 | (2006.01) | |
| B05B 15/12 | (2006.01) | |
| B01D 46/10 | (2006.01) | |

(52) U.S. Cl.
CPC ....... B05B 15/1248 (2013.01); B01D 46/0001 (2013.01); B01D 46/10 (2013.01); *Y10T 29/49826* (2015.01)

(58) Field of Classification Search
CPC ................ B01D 46/00; B01D 35/147; B01D 2201/162
USPC ................... 55/597, 521, 529; 95/273, 284; 210/494.1
See application file for complete search history.

(56) References Cited

U.S. PATENT DOCUMENTS

| | | | |
|---|---|---|---|
| 3,075,337 A | | 1/1963 | Andreae |
| 3,478,498 A | | 11/1969 | Sauermann |
| 4,008,060 A | | 2/1977 | Andreae |
| 4,047,914 A | | 9/1977 | Hansen et al. |
| 4,452,619 A | | 6/1984 | Wright et al. |
| 4,894,073 A | | 1/1990 | Andreae |
| 4,955,995 A | | 9/1990 | Pontius |
| 5,051,118 A | | 9/1991 | Andreae |
| 5,252,111 A | * | 10/1993 | Spencer ............. B01D 46/2455 55/489 |
| 5,500,271 A | | 3/1996 | Pasch et al. |
| 6,017,377 A | * | 1/2000 | Brown .................. B01D 45/08 55/435 |
| 6,071,419 A | * | 6/2000 | Beier .................... B01D 29/012 156/160 |
| 6,162,270 A | * | 12/2000 | Nystrom ............. B05B 15/1248 55/385.2 |
| 6,527,838 B2 | | 3/2003 | Volo et al. |
| 6,790,397 B2 | | 9/2004 | Richerson et al. |
| 6,923,911 B1 | * | 8/2005 | Beier .................... B01D 29/012 210/273 |
| 7,186,287 B2 | * | 3/2007 | Beier .................... B01D 46/002 55/378 |

(Continued)

*Primary Examiner* — Jacob T Minskey
*Assistant Examiner* — Minh-Chau Pham
(74) *Attorney, Agent, or Firm* — Jason H. Foster; Kremblas & Foster

(57) ABSTRACT

The invention is a filter for paint booth filtration systems. The filter has a housing made up of a peripheral wall, which extends around the entire periphery of the filter, and opposing filter-retaining screens. The filter-retaining screens form the upstream and downstream faces of the filter. The filtration element may be a frame with lattice and a rigidifying channel therearound combined with a filtration material extended around the frame. The filtration material may be slit and expanded paper that is joined at overlapping edges, or merely overlapped, to form a sleeve. One or more of the filtration elements are mounted in the housing substantially parallel to one another and to the screens.

7 Claims, 7 Drawing Sheets

(56) References Cited

U.S. PATENT DOCUMENTS

| | | | |
|---|---|---|---|
| 7,771,517 B2 * | 8/2010 | Dralle | B01D 35/147 210/494.1 |
| 8,499,716 B2 * | 8/2013 | Norcross | B05B 15/0431 118/326 |
| 8,591,616 B2 * | 11/2013 | Sullivan | B01D 46/0054 55/351 |
| 8,617,278 B2 * | 12/2013 | Sullivan | B01D 46/18 55/351 |
| 2004/0163368 A1 | 8/2004 | Lee et al. | |

* cited by examiner

PAINT BOOTH FILTER

CROSS-REFERENCES TO RELATED APPLICATIONS

This application claims the benefit of U.S. Provisional Application No. 61/792,956 filed Mar. 15, 2013. The prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to filters, and more particularly to filters made for applications where industrial coatings are applied.

Paint, and other industrial coatings, are commonly applied to products in manufacturing facilities by spraying the products after placing the products in booths or stations that are separated from the rest of the manufacturing facility. Paint (which is a term used herein to include all industrial coatings) spraying creates "overspray" of atomized particles that do not adhere to the product's surface. Such particles are of various sizes, and can remain wet for some time. Therefore, paint arrestors are used to filter the air inside the paint booth prior to exhausting the air to the environment outside the paint booth to remove wet and dry overspray particles.

Air filtration devices used in booths where painting by spraying is carried out are well known, such as in U.S. Pat. Nos. 3,075,337; 4,008,060; 4,894,073; 5,051,118; and 6,790,397. In these patents, which are incorporated herein by reference, methods and apparatuses are disclosed describing how to take the dry and/or wet particles in suspension out of a gaseous flow, generally air.

To purify such gaseous flows an "inertia" filter can be used. An inertia filter causes turbulence in the flow of gas that contains the paint particles, thereby projecting the suspended particles against the walls of the filters due to the particles' inability to flow around the walls of the filters as well as air. These filters are known in the industry to be sold by Andreae Team, Inc. of Ardmore, Okla. In inertia filters, the filters are of the pleated or accordion type and have two or three walls made of air-impervious material, generally paperboard. These walls are connected along one or two folds and have different dimensions so that chambers are created between the walls. These walls have openings that are not aligned with each other along the direction of air flow. Thus, a turbulent flow of the gas is created within the chambers of the filter. This turbulent flow causes projection of the paint particles, by the inertia of the particles, against the walls of the chambers where they are deposited. Inertia filters ensure a constant pressure drop over their lifetime but have the drawback that they do not retain small, light particles, the mass of which is insufficient for inertia to project them against the walls for deposition. For certain types of paint, particularly lacquers, these filters have an efficiency that cannot satisfy the more strict environmental standards.

Alternatively, filtration can be accomplished by screening/sieving, i.e. by passage of the gas and entrained particles through a porous media with tortuous paths causing impact of the particles with the media, and causing particles to be held when the particles encounter a tortuous path smaller than the particle. These filters typically do not retain dry particles having a size smaller than their pores. Thus, screening filters commonly have a low efficiency. It is possible to make such filters with smaller pores to increase efficiency, but this introduces a substantial pressure drop across the media. Loading with particulate causes such screening filters to clog rapidly, thereby causing an increasing pressure drop, necessitating frequent replacement.

The filters now in use in this field have to be changed often, because government environmental standards generally require arrestance efficiencies greater than or equal to 98%. These filters are made by removable elements intended to be mounted in adapted frames, such as channels into which planar filter cartridges are inserted. The air flow is driven perpendicularly through the filter cartridges as in a residential heating, cooling and ventilation filtration system.

There is a need for an improved filter that has low pressure drop and high paint retention efficiencies, and that does not have to be replaced at a rate that either slows work substantially or causes the cost of use to be too high.

BRIEF SUMMARY OF THE INVENTION

The invention is a filter for industrial coating application filtration systems. The filter has a housing made up of a peripheral wall, which extends around the entire periphery of the filter, and opposing filter-retaining screens. The filter-retaining screens form the upstream (inlet) and downstream (outlet) faces of the filter. Both the peripheral wall and the filter-retaining screens are preferably made of paperboard, corrugated paper, plastic or any other suitable material that remains rigid enough to retain its shape under the circumstances in a paint booth filtration system.

Within the housing are placed at least one, and possibly more, modular filtration structures made up of a frame, as shown in FIGS. 1 and 2, wrapped with at least one layer of filtration material, such as slit and expanded paper. The frame is preferably paperboard, but could be corrugated paper, plastic or any other suitable material. The frame is made up of a lattice of filter-retaining material that mounts at its outer edges to a peripheral channel, which serves as a rigid structure, to which the filter-retaining lattice is mounted.

A sleeve of filtration material, which can be slit and expanded paper, is created, preferably by stitching the overlapping ends of one or more sheets of slit and expanded paper together, and the frame is inserted therein. The sleeve can be made in any way, including by overlapping the end of a long sheet a substantial distance to create a frictional grip on inner layers, in the manner of a roll of paper. A purpose of maintaining the sleeve around the frame is to maintain the diamond-shaped openings in the paper in the opened configuration.

The layers of paper can differ from the front to the back of the filter, such as by the sizes of the holes in the paper, the solid material between the holes, the shapes of the holes and/or the positions of the holes relative to the solid portions. This can thereby allow one to create a filter of ever decreasing hole size, offset holes, etc. to maximize paint retention and depth loading for high holding capacity. In one contemplated embodiment, a frame and sleeve combination placed in the most upstream position has the largest holes, the next downstream frame and sleeve combination has smaller holes, and so forth to the back of the housing where air exits at the downstream end.

Figure 1:
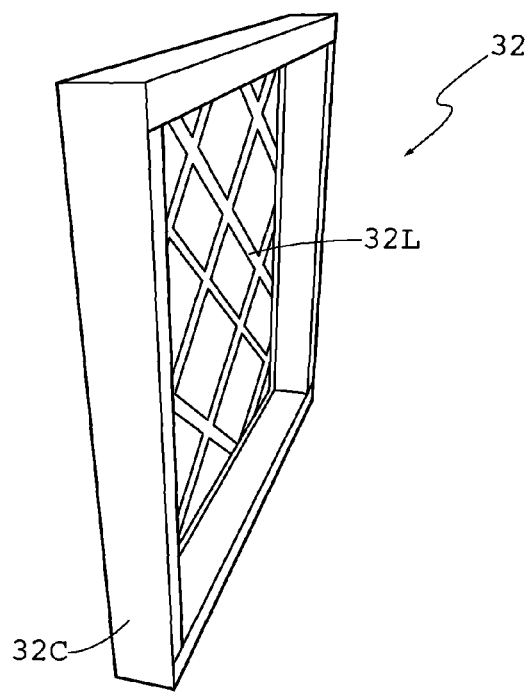
FIG. 1 is a view in perspective illustrating a frame used in the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 61/792,956 filed Mar. 15, 2013 is incorporated in this application by reference.

Figure 9:
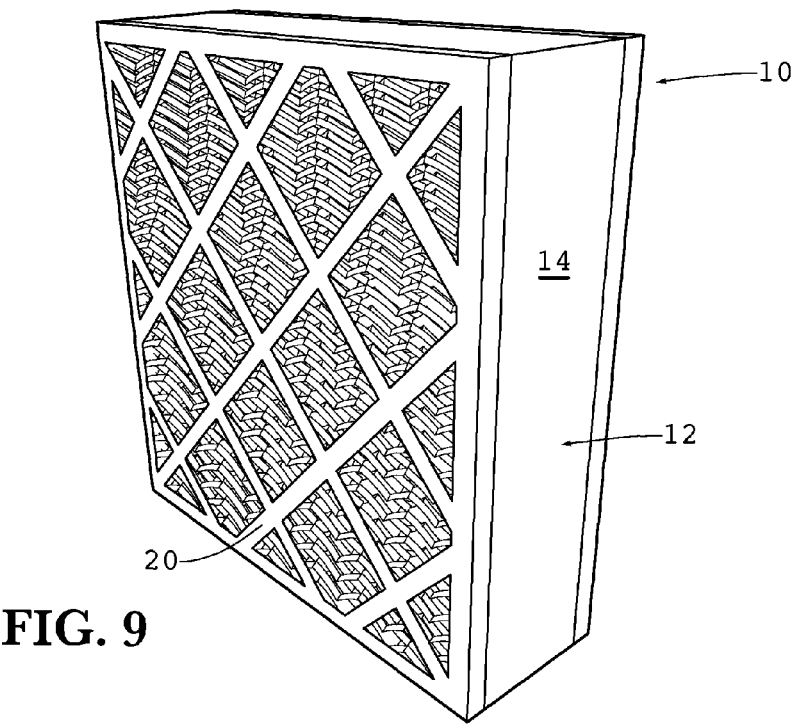
FIG. 9 is a view in perspective illustrating a completed filter made according to the present invention.
Figure 10:
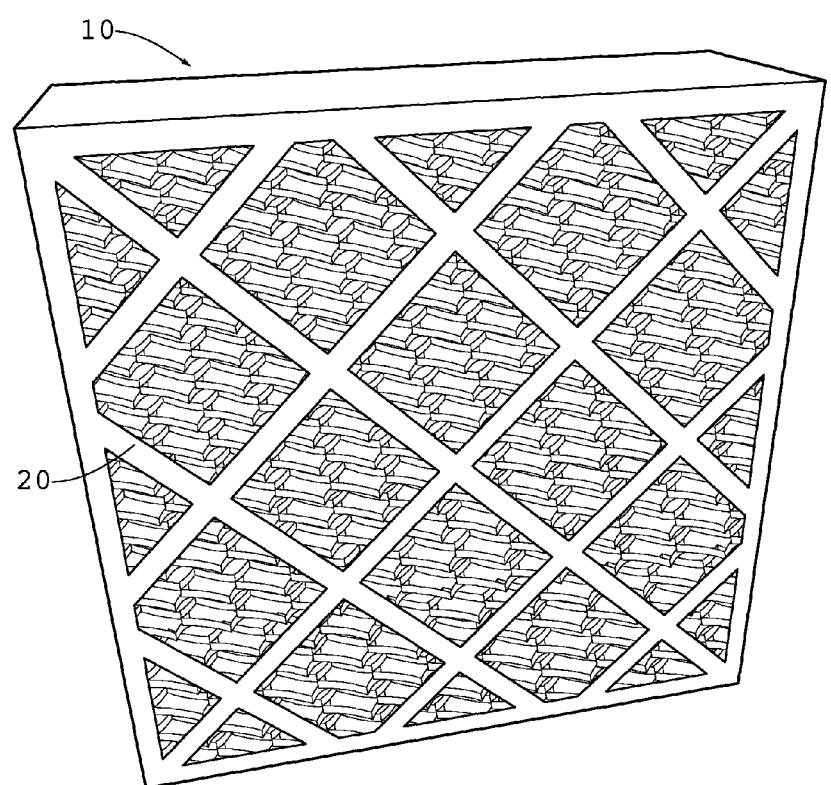
FIG. 10 is a view in perspective illustrating a completed filter made according to the present invention.

The filter 10 shown in FIGS. 9 and 10 has a housing 12 made up of a peripheral wall 14, which extends around the entire periphery of the filter, and opposing filter-retaining screens 20 and 22 (screen 22 is not visible in FIGS. 9 and 10). The filter-retaining screen 20 forms the upstream face, and the screen 22 forms the downstream face, of the filter. Both the peripheral wall 14 and the filter-retaining screens 20 and 22 are preferably made of paperboard, corrugated paper, plastic or any other suitable material that remains rigid enough to retain its shape under the circumstances in a paint booth filtration system. The screens are shown with a diamond shape oriented vertically, but it should be noted that any shape opening and pieces connecting across the housing can be used to retain the filter elements. No specific shape is critical, so long as the shape used restrains the filter elements and provides essentially zero resistance to the flow of gas through. The screens 20 and 22 maintain the wall 14 in a rectangular shape in a preferred embodiment.

Figure 2:
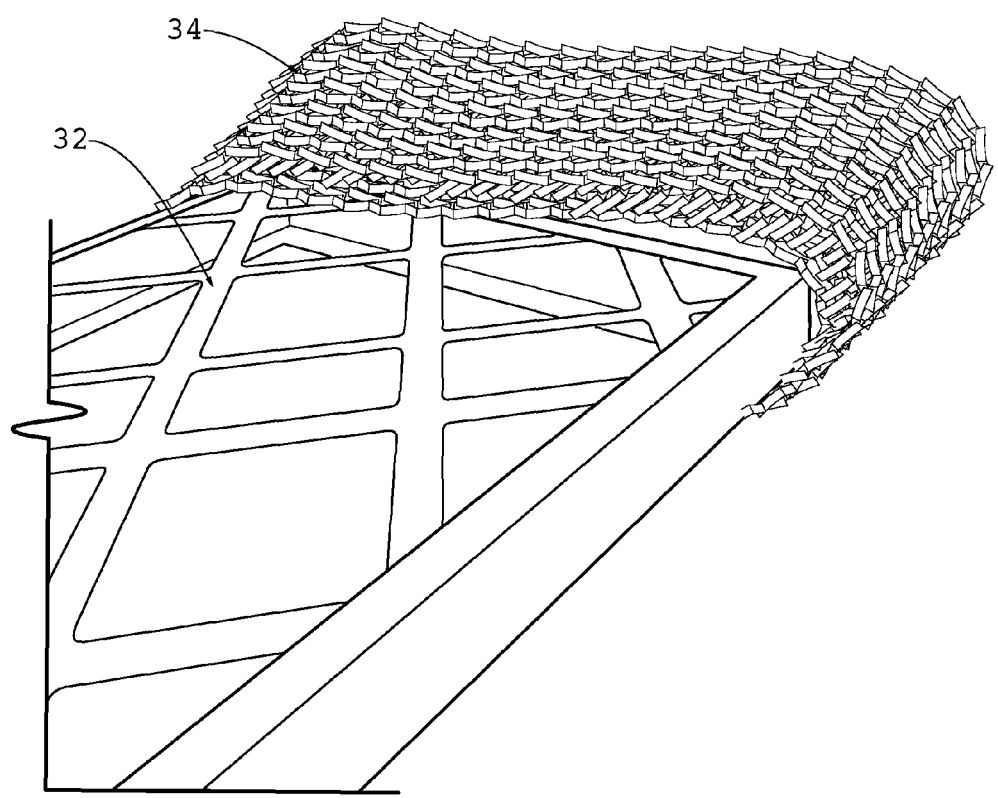
FIG. 2 is a view in perspective illustrating a sleeve of filtration material beginning to be mounted on the frame of FIG. 1.
Figure 3:
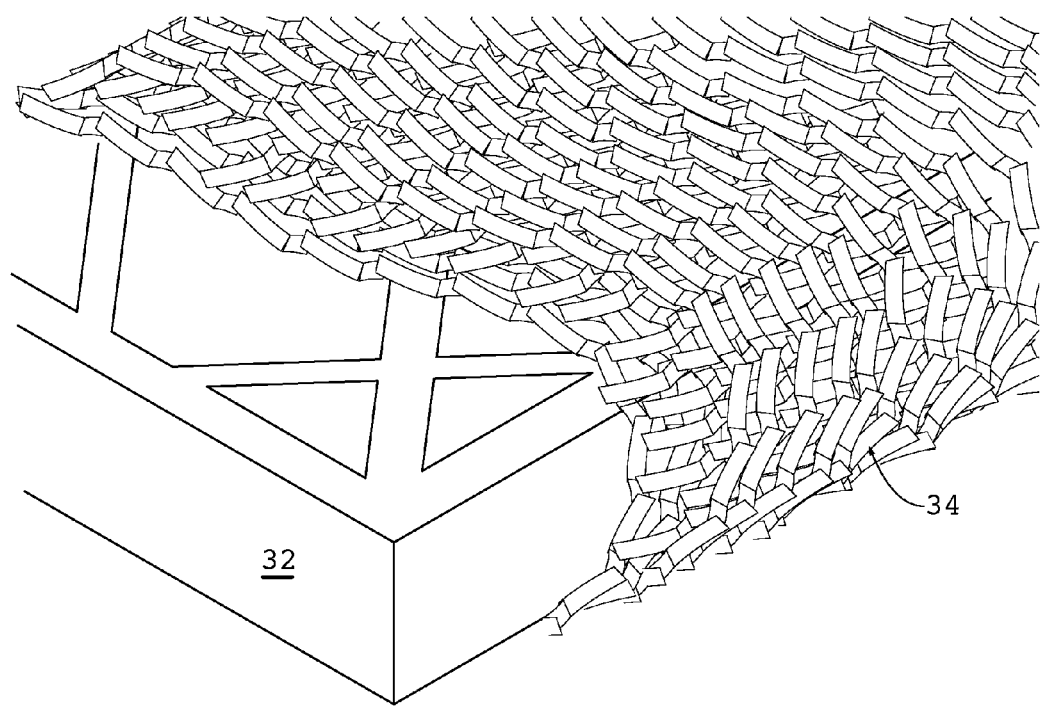
FIG. 3 is a view in perspective illustrating the sleeve of filtration material being mounted farther on the frame of FIG. 1.

Within the housing 12 are placed at least one, and possibly more, modular filtration structures 30 made up of a frame 32, as shown in FIGS. 1 and 2, wrapped with at least one layer of filtration material, such as slit and expanded paper 34, as shown in FIGS. 2-3. The frame 32 is preferably paperboard, but could be corrugated paper, plastic or any other suitable material. As shown in FIGS. 1 and 2, the frame 32 is made up of a lattice 321 of filter-retaining material that mounts at its outer edges to a peripheral channel 32c, which serves as a rigid structure, to which the filter-retaining lattice is mounted. The frame 32 thus is not crushed by moderate inward forces, and the channel 32c is thick enough to form a gap between the innermost layers of the paper 34. Of course, a frame 32 that is rigid enough may not need lattice to keep the openings of the slit and expanded paper in the opened configuration when the paper is stretched around the frame. However, a rectangular (or other shaped) frame alone may be sufficient. Furthermore, a U-shaped frame with slit and expanded paper pads adhered to the frame in a stretched condition may also be used.

A sleeve of filtration material, which can be slit and expanded paper 34, is thus preferably created by stitching, gluing, stapling or otherwise fastening the overlapping ends of one or more sheets of slit and expanded paper 34 together, before the frame 32 is inserted therein. The paper sleeve 34 can be made in any way, including by overlapping the end of a long sheet a substantial distance to create a frictional grip on between layers of slit and expanded paper, in the manner of a roll of paper. The sleeve is then disposed around the frame 32 in a stretched condition to maintain the openings in the paper in an opened configuration (e.g., with a diamond shape).

The illustrations of FIGS. 2-3 show one way of inserting the frame into the sleeve, which includes manually forcing the sleeve open by applying radially outwardly directed force (such as by hand, by a machine or using a conical "funnel" that opens the sleeve as the sleeve is placed on the conical structure), and then either sliding the frame into the enlarged opening between the layers of slit and expanded paper, or sliding the enlarged opening of the sleeve around the frame.

The paper of the sleeve preferably has a spring effect inasmuch as it retracts radially inwardly when the expanding force is removed, thereby clamping the frame 32 with an inwardly directed force that creates a friction fit against the frame 32. Thus, a longitudinal force is necessary to remove the frame 32 from within the sleeve. Glue, staples, stitching or other fasteners can be used to fix the sleeve to the frame 32, but this is not required due to the friction that holds the two components together to form the modular filtration structure 30. There is a space between the layers of paper caused by the thickness of the frame 32, and this space provides benefits when arresting paint particles.

The openings in the lattice 321 provide substantially zero resistance to the flow of air through the frame 32. The lattice 321 mainly serves to keep the paper 34 open and in position to receive paint particles. There may be some situations in which there is an advantage to the location of the lattice 321.

The lattice 321 of the frame 32 may be positioned on the upstream side of each modular filtration structure 30. Alternatively, the lattice can be on the downstream side of the modular filtration structure 30.

Figure 4:
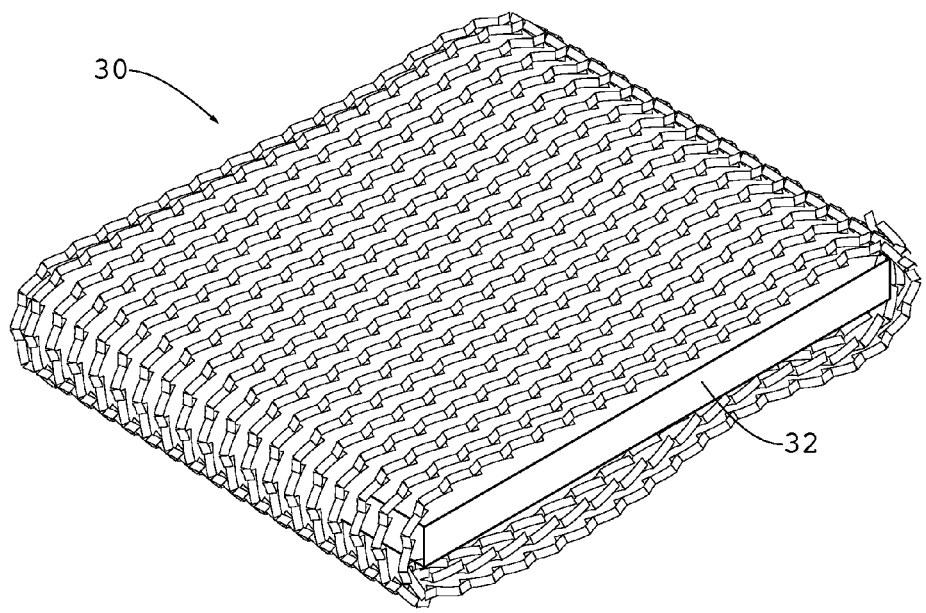
FIG. 4 is a view in perspective illustrating the sleeve fully mounted on the frame of FIG. 1.
Figure 5:
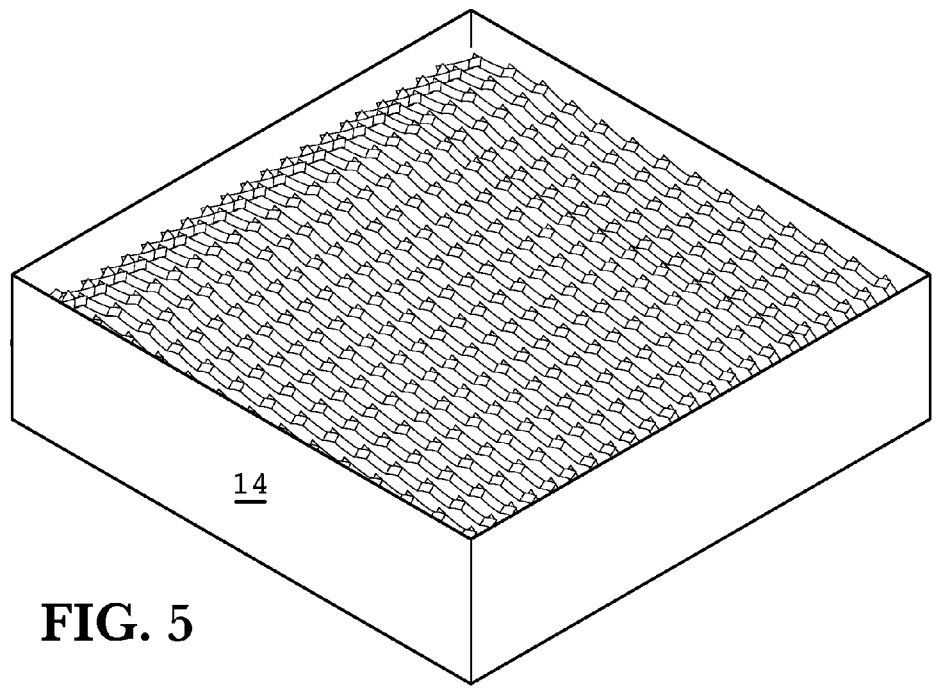
FIG. 5 is a view in perspective illustrating a sleeve/frame combination like that of FIG. 4 installed in a housing.
Figure 6:
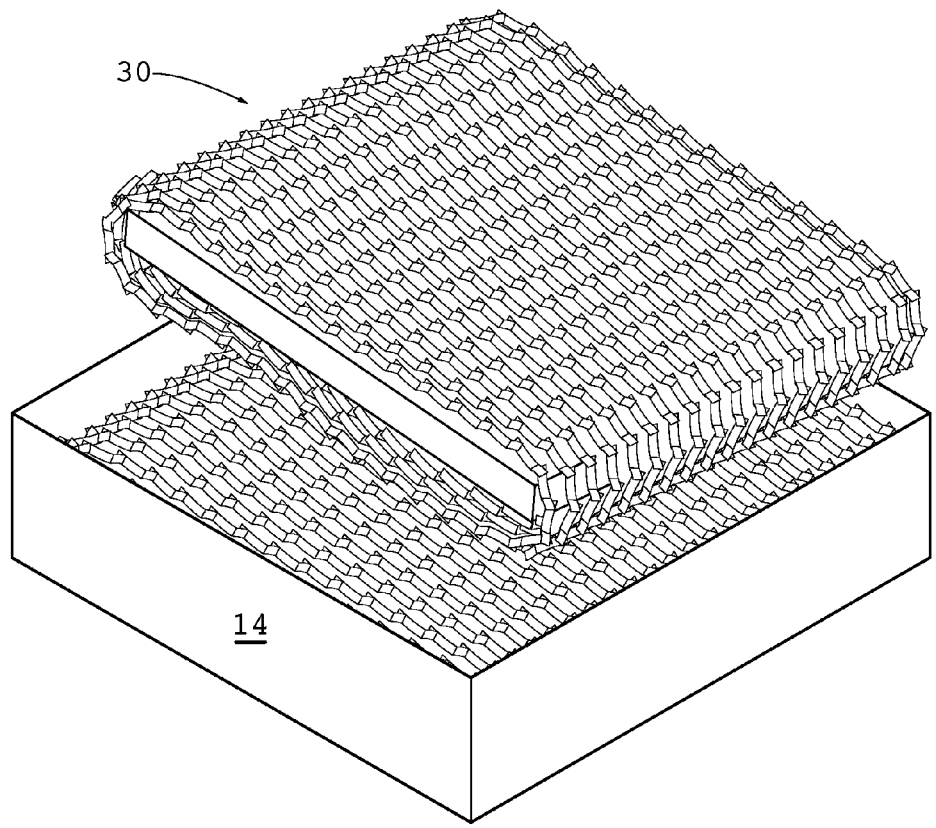
FIG. 6 is a view in perspective illustrating the sleeve/frame combination of FIG. 4 being installed in the housing against the sleeve/frame combination of FIG. 5.
Figure 7:
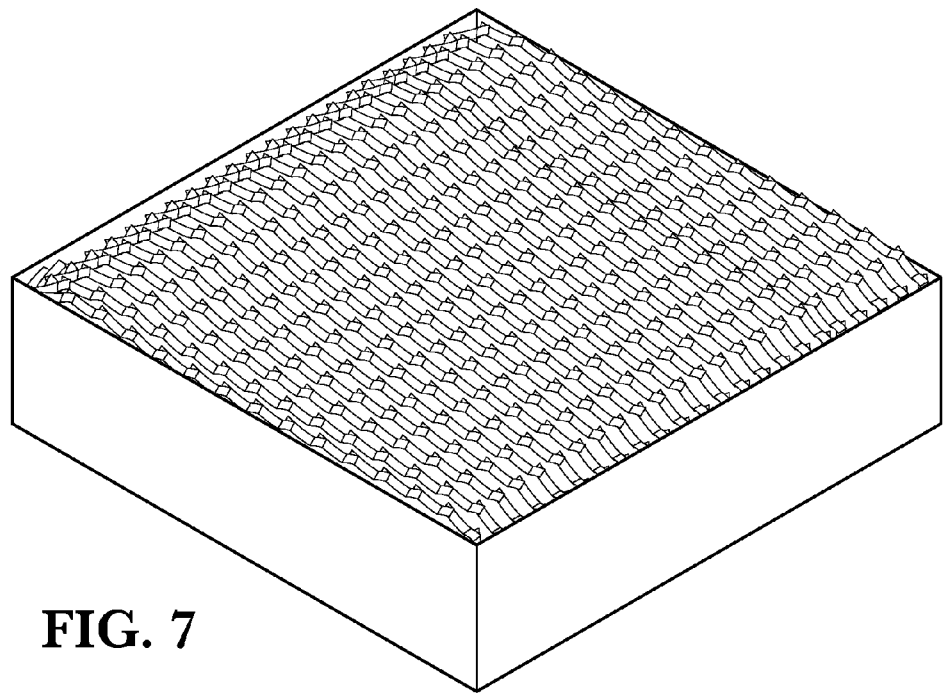
FIG. 7 is a view in perspective illustrating the sleeve/frame combination of FIG. 4 being further installed in the housing.
Figure 8:
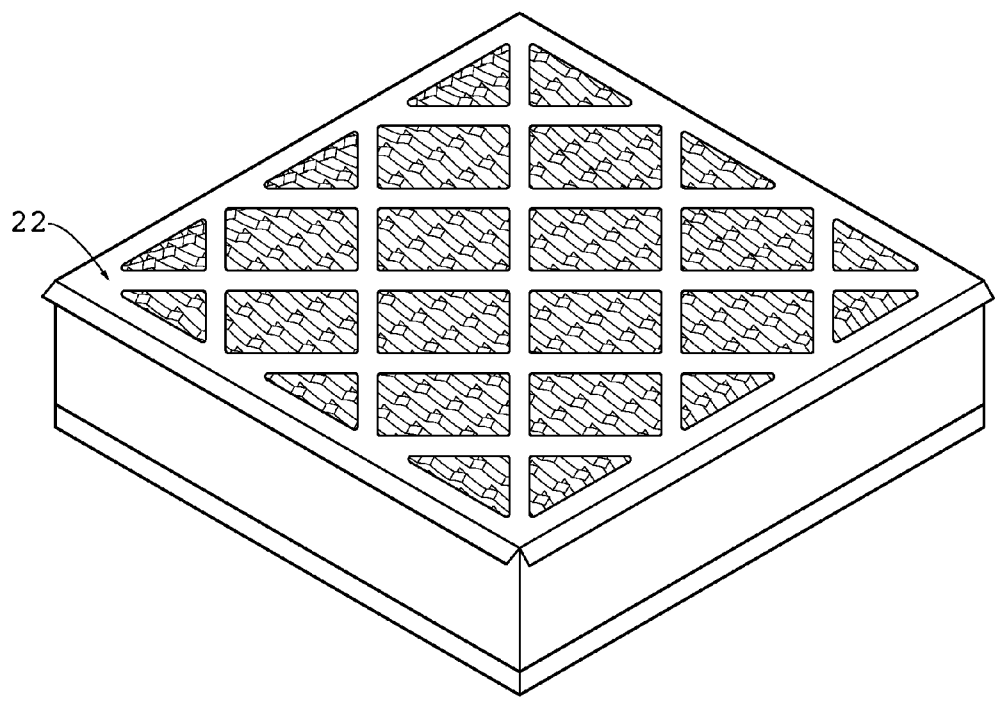
FIG. 8 is a view in perspective illustrating a screen being installed on the housing.

Once the combination of the frame 32 and sleeve is formed into the modular filtration structure 30 shown in FIG. 4, the modular filtration structure 30 is inserted into the housing 12 (FIGS. 5-7), which has internal width and length substantially equal to the external width and length of the modular filtration structure 30. As many modular filtration structures 30 as desired, such as one, two, three, four, five or more, are inserted in the housing 12, depending upon the thickness of the combinations and the housing 12, substantially parallel to one another. Then the filter-retaining screens 20 and 22 are mounted to the peripheral wall 14 substantially parallel to the structures 30 to enclose the housing 12. In a contemplated embodiment, the filter-retaining screens are integral to the peripheral wall, and multiple modular filtration structures are inserted through an opening in the end of the housing.

In another embodiment contemplated, a long, multilayered pad of slit and expanded paper is preferably formed by stitching or gluing layers together and/or to a frame to maintain the slits in the paper in the opened position where they may form a diamond shape. Alternatively, no attachment is used, and the paper is merely folded into a pad shape and inserted in a housing. The pad may be cut lengthwise into pieces approximately the interior size of the housing. These pieces are inserted into a housing that is substantially similar to the housing 12 described above. This embodiment is thus made up of layers of slit and expanded paper placed in the housing in modular filtration units, which can be referred to as sheets or pads, with or without a frame 32.

In any embodiment, the paper can have larger slits toward the upstream side of the housing, and smaller slits toward the downstream side, along with offset openings and greater closed area between the openings. These layers of paper can be installed in the housing in a progressive fashion so that the particles of paint and other material pass through ever-decreasing opening sizes as they progress through the filter. This progressive reduction in opening size can be incorporated into any embodiment described herein, including the embodiment of FIGS. 1-8 that uses the frames 32 inside the paper sleeves. Furthermore, one or more webs of synthetic filtration material can be placed in the housing as the most downstream layer or layers of filter material. This material may be a polyester non-woven filtration material.

The desired number of layers of stitched (or otherwise connected) layers of slit and expanded paper or combinations of frames and paper sleeves are placed in the housing to construct a filter of desired thickness. Furthermore, the invention herein is useful for any number of modular filtration structures 30 within a housing, and the housing may be of virtually unlimited thickness. The desired thicknesses may be two inches, four inches, six inches or any other thickness desired, merely by building up the desired thickness of paper and/or combinations of paper sleeves and frames.

The slits of the slit and expanded paper are contemplated to be about one inch long or less, but they could be longer, including 1.25 inches, 1.5 inches, 1.75 inches, 2.0 inches or more. The smaller slits can be as small as one-half inch, one-quarter inch, one-eighth inch or smaller.

Figure 11:
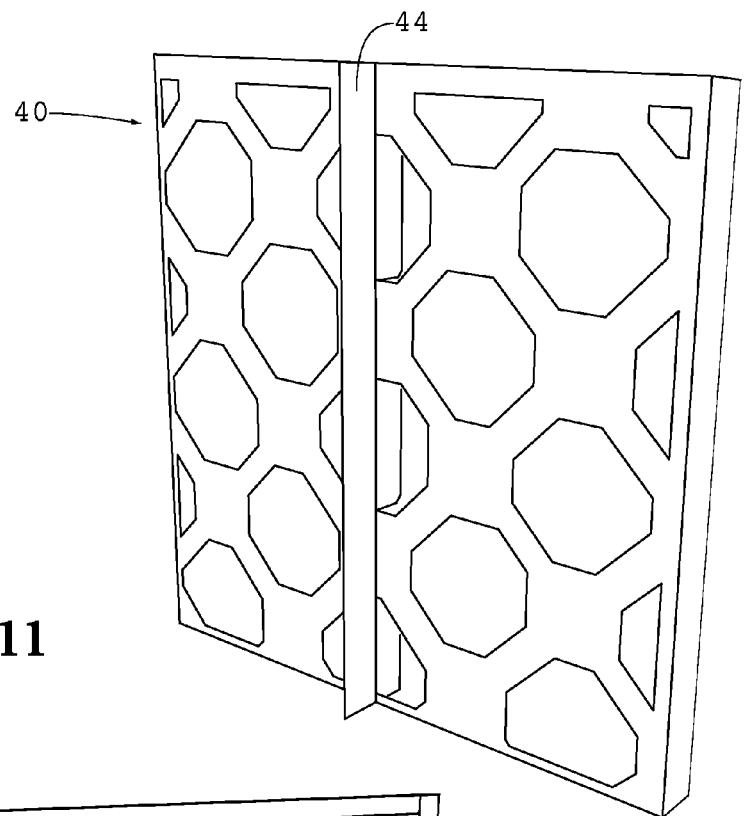
FIG. 11 is a view in perspective illustrating a back side of an optional labyrinth structure.
Figure 12:
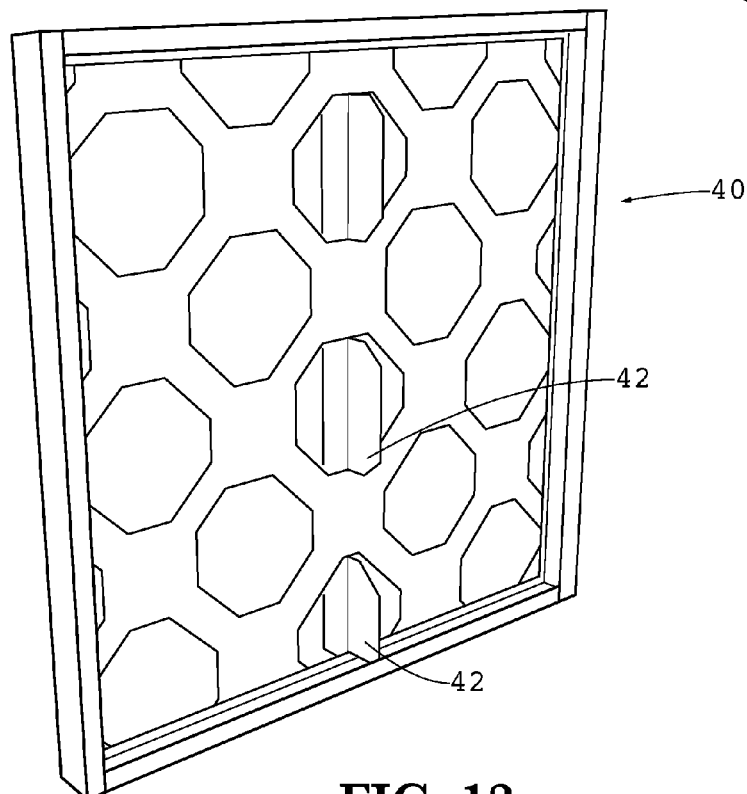
FIG. 12 is a view in perspective illustrating a front side of the optional labyrinth structure of FIG. 11.
Figure 13:
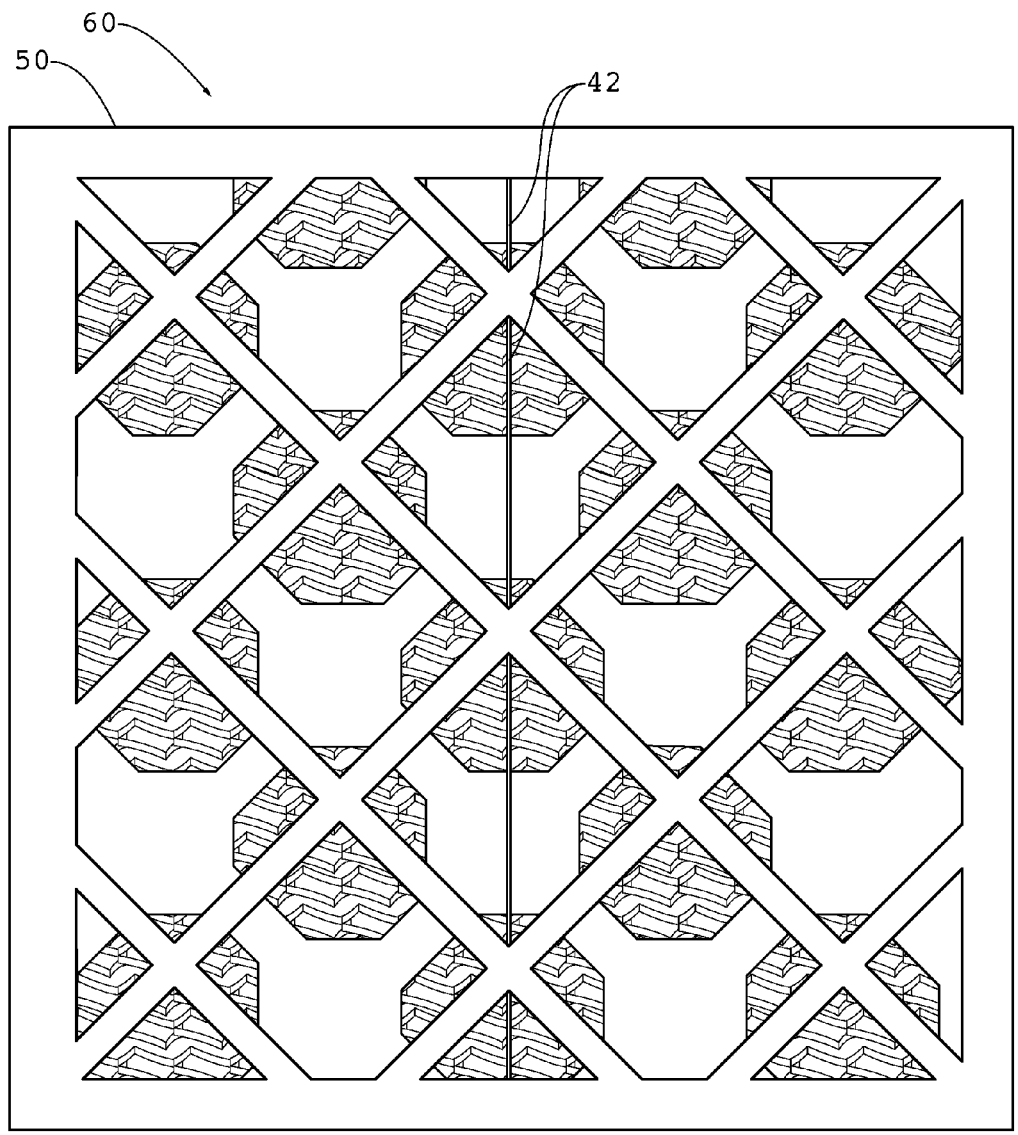
FIG. 13 is a view in perspective illustrating an intake side of a filter incorporating the optional labyrinth structure.

An optional labyrinth structure 40 (FIG. 11) may be used as a spacing element on the air intake side of the filter housing 50 (FIG. 13) to promote increased airflow turbulence and redirection of the paint particles, as well as to provide a zone for enhanced holding capacity of the device 60. Note that tabs 42 extend through openings in the screen, and a fin 44 extends into the filtration material in the housing 50.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A filter for a spray coating system comprising:
   (a) a housing including:
      (i) a peripheral wall having an upstream edge defining a first opening in the housing and a downstream edge defining a second opening in the housing;
      (ii) an inlet screen attached to the housing at the upstream edge of the peripheral wall and spanning across the first opening in the housing; and
      (iii) an outlet screen attached to the housing at the downstream edge of the peripheral wall and spanning across the second opening in the housing, wherein the inlet and outlet screens provide substantially no resistance to the flow of air therethrough; and
   (b) a first substantially planar frame; and
   (c) a first filtration material sleeve having a bore in which the first frame is mounted with the first sleeve exerting an inwardly-directed force on the first frame due to stretching of the first sleeve to receive the first frame, said inwardly-directed force tending to grip the first frame and thereby retain the first sleeve on the first frame while simultaneously opening pores in the first sleeve, wherein the first frame and first sleeve combination is disposed within the housing between the screens and the peripheral wall, the first frame providing substantially no resistance to the flow of air therethrough, wherein at least the outlet screen resists the first frame and first sleeve combination from being removed from the housing.

2. The filter in accordance with claim 1, wherein the first sleeve is made of slit and expanded paper.

3. The filter in accordance with claim 2, further comprising a second substantially planar frame, around which a second slit and expanded paper sleeve is extended, wherein the second frame and second sleeve combination is disposed within the housing between the screens and the peripheral wall and substantially parallel to said first planar frame, the second frame providing substantially no resistance to the flow of air therethrough.

4. The filter in accordance with claim 3, wherein the slit and expanded paper nearer the inlet screen has openings larger than the slit and expanded paper near the outlet screen.

5. A filter for a spray coating system comprising:
   (a) a housing including:
      (i) a peripheral wall having an upstream edge defining a first opening in the housing and a downstream edge defining a second opening in the housing;

(ii) an inlet screen attached to the housing at the upstream edge of the peripheral wall and spanning across the first opening in the housing; and (iii) an outlet screen attached to the housing at the downstream edge of the peripheral wall and spanning across the second opening in the housing, wherein the inlet and outlet screens provide substantially no resistance to the flow of air therethrough;

(b) a first substantially planar frame and a first slit and expanded paper sleeve having a bore in which the first frame is mounted with the first sleeve exerting an inwardly-directed force on the first frame due to stretching of the first sleeve to receive the first frame, said inwardly-directed force tending to grip the first frame and thereby retain the first sleeve on the first frame while simultaneously opening pores in the first sleeve, wherein the first frame and first sleeve combination is disposed within the housing between the screens and the peripheral wall substantially parallel to the screens, the first frame providing substantially no resistance to the flow of air therethrough, wherein at least the outlet screen resists the first frame and first sleeve combination from being removed from the housing;

(c) a second substantially planar frame and a second slit and expanded paper sleeve having a bore in which the second frame is mounted with the second sleeve exerting an inwardly-directed force on the second frame due to stretching of the second sleeve to receive the second frame, said inwardly-directed force tending to grip the second frame and thereby retain the second sleeve on the second frame while simultaneously opening pores in the second sleeve, wherein the second frame and second sleeve combination is disposed within the housing between the screens and the peripheral wall substantially parallel to the first frame and the screens, the second frame providing substantially no resistance to the flow of air therethrough.

6. A method of making a filter for a spray coating system, the method comprising:

(a) forming a peripheral wall into a housing having an upstream edge defining a first opening and a downstream edge defining a second opening;

(b) mounting an inlet screen to the housing at the upstream edge across the first opening in the housing;

(c) stretching a first filtration material sleeve to enlarge a bore formed therein;

(d) inserting a first substantially planar frame into the enlarged bore formed in the first sleeve and then releasing the first sleeve to exert an inwardly-directed force on the first frame, said inwardly-directed force tending to grip the first frame and thereby retain the first sleeve on the first frame while simultaneously opening pores in the first sleeve;

(e) disposing the first sleeve and first frame combination within the housing between the screens and the peripheral wall substantially parallel to the screens, the first frame providing substantially no resistance to the flow of air therethrough, wherein at least the outlet screen resists the first frame and first sleeve combination from being removed from the housing; and (f) mounting an outlet screen to the housing at the downstream edge across the second opening in the housing.

7. The method in accordance with claim 6, further comprising:

(a) stretching a second filtration material sleeve to enlarge a bore formed therein; and (b) inserting a second substantially planar frame into the enlarged bore formed in the second sleeve and then releasing the second sleeve to exert an inwardly-directed force on the second frame, said inwardly-directed force tending to grip the second frame and thereby retain the second sleeve on the second frame while simultaneously opening pores in the second sleeve; and (c) disposing the second sleeve and second frame combination within the housing between the screens and the peripheral wall substantially parallel to the screens and the first frame, the second frame providing substantially no resistance to the flow of air therethrough.

\* \* \* \* \*